(12) United States Patent
Lee et al.

(10) Patent No.: US 6,590,667 B1
(45) Date of Patent: Jul. 8, 2003

(54) METHOD AND AN APPARATUS FOR MEASURING THE FLYING HEIGHT WITH SUB-NANOMETER RESOLUTION

(75) Inventors: Jau-Hu Lee, Taipei (TW); Chih-Kung Lee, Taipei (TW); Shuen-Chen Shiue, Taipei (TW); Shu-Sheng Lee, Taipei (TW); Jiun-Yan Wu, Taipei (TW)

(73) Assignee: National Science Council, Taipei (TW)

( * ) Notice: Subject to any disclaimer, the term of this patent is extended or adjusted under 35 U.S.C. 154(b) by 386 days.

(21) Appl. No.: 09/624,685

(22) Filed: Jul. 24, 2000

(30) Foreign Application Priority Data

Jul. 27, 1999 (TW) ........................................ 88112731 A

(51) Int. Cl.$^7$ ............................ G01B 11/02; G01B 9/02; G01J 4/00
(52) U.S. Cl. ......................... 356/507; 356/493; 356/369
(58) Field of Search ................................ 356/491–493, 356/503–505, 507, 496, 369, 243.3, 364

(56) References Cited

U.S. PATENT DOCUMENTS

| | | | |
|---|---|---|---|
| 5,557,399 A | * | 9/1996 | de Groot ..................... 356/492 |
| 5,600,441 A | * | 2/1997 | de Groot et al. ............ 356/492 |
| 5,793,480 A | * | 8/1998 | Lacey et al. .................. 356/73 |

OTHER PUBLICATIONS

McMillan, T. C. and Talke, F. E., "Ultra Low Flying Height Measurements Using Monochromatic and Phase Demodulated Laser Interferometry", IEEE Transcations on Magnetics, vol. 30, No. 6, Nov. 1994, pp. 4173–4175.

Best, G. L. et al., "Precise Optical Merasurement of Slider Dynamics", IEEE Transcations on Magnetics, vol. MAG–22, No. 5, Sep. 1986, pp. 1017–1018.

* cited by examiner

*Primary Examiner*—Russell Adams
*Assistant Examiner*—Andrew Sever
(74) *Attorney, Agent, or Firm*—Michael Best & Friedrich LLC

(57) ABSTRACT

A method and apparatus is claimed for measuring the distance between a slider and a transparent disk with sub-nanometer resolution. The flying height is measured by applying ellipsometry. The measurement is done by: providing a sampling light beam with adjustable initial polarization state by phase modulation, and with variable incident angles relative to the air film and reflecting the sampling light off of the specimen at a detection site forming a reflected light beam that is then reflected at the detection site again and then guided to both detectors for detecting the intensity and phase change of the light beam to determine the gap's thickness as well as passing some light to a microscope used for observation of the detecting site on the specimen.

54 Claims, 7 Drawing Sheets

METHOD AND AN APPARATUS FOR MEASURING THE FLYING HEIGHT WITH SUB-NANOMETER RESOLUTION

FIELD OF THE INVENTION

The invention disclosed is a method and an apparatus for measuring distance between a slider and a transparent disk with sub-nanometer resolution, particularly in nanometer flying height measurement of a read-write head on a glide disk by applying ellipsometry.

BACKGROUND OF THE INVENTION

According to the prior art, the methods for measuring thickness of an air film, e.g. flying height of a slider, are generally classified into a) capacitance type, b) light interferometry, and c) ellipsometry with fixed incident angle. The capacitance type is used to measure flying information of a slider. Three unshielded capacitance probes are mounted on the slider for monitoring the roll angle, the pitch angle, and the flying height of the slider. However, the measured signal intensity is inversely proportional to the flying height of the slider. Besides, the slider for measuring the flying height by using this method must be made of special materials, e.g. ceramics, and the cost is high. Therefore, the capacitance type is nowadays out of date. Generally, the flying height measured by using this method is limited ranging from 1000 nm to 5000 nm.

Owing to different light beam sources, different methods, e.g. laser beam interferometry or white light interferometry, for measuring the flying height of a slider by applying interferometry are developed. The method for measuring the flying height of a slider by applying laser beam interferometry is published by Best et. al. on pp. 1017–1018, No. 5, Vol. MAG-22, IEEE Transaction On Magnetics in 1986. The monochrome is used as the light source. The phase difference of the incident light toward the slider and the reflected light from the slider is 180 degrees. Because of interference of the incident light and the reflected light, the flying height of the slider can be obtained according to the counted changes of the interference fringes. However, the accuracy of the counted changes of the interference fringes is not high. Moreover, the slider is assumed being made of dielectric material. Therefore, the absorption coefficient of the slider is neglected, and the neglected absorption coefficient thus results in great deviation of the measured flying height of the slider. With respect to the white light interferometry, the interference fringes are analyzed by using a spectrum meter. The two wavelengths of the corresponding maximum light intensity and the corresponding weakest light intensity are obtained for determining the flying height of a slider. The flying height measured by using this method is limited ranging from 127 nm to 750 nm. Once the distance between the slider and the disk is less than 127 nm, there are no apparent peaks and valleys of the interfering light intensity for the interference fringes to determine the flying height of the slider. As for the dynamic interferometry developed by the Phase Metrics Company, the change of the flying height is more than a quarter of the wavelength for obtaining the curves of the corresponding movements for the continuous changes of the maximum light intensity and the weakest light intensity. The curves are used for calibration before the flying height is measured. For example, Ohkuboy developed a system for measuring the flying height of a slider by using the He—Ne laser as the light source. The fringe orders are obtained according to the variations of the interfering light intensities while the slider lands on the disk for being used for calibration before measuring the flying height. In 1992, C. Lacey disclosed to use the mercury arc lamp, which primarily incident the light beam with wavelengths of 436 nm, 548 nm and 580 nm, as the interfering light source. The calibrating curve is obtained while the magnetic head is unloaded from the disk by the rotating arm.

Generally, the laser Doppler Vibrometer/Interferometry (LDV/I) is used to determine the dynamic actions of the suspension systems for a slider of a hard disk. T. C. McMillan and F. E. Talke uses three wavelengths laser beam as the interfering light source in 1994 for measuring the flying height of a slider (pp. 1017–1018, No. 5, Vol. MAG-22, IEEE Transaction On Magnetics). The intensities of the interference fringes are determined by the method of interpolation, where the maximum light intensity and the obtained weakest light intensity are obtained first. The flying height of a slider less than 100 nm is measured by phase demodulation. The method for measuring the flying height of a slider by applying laser beam division interferometry is published by C. K. Lee and T. W. Wu on pp. 1675–1680, No. 9, Vol. 33, AIAA Journal in 1995. One laser beam is projected onto the back of the slider to determine the dynamic characteristic thereof, while the other is projected onto the surface of the disk to determine the dynamic contact point in real time to modify deviation for obtaining higher accuracy. M. Staudenmann, M. J. Donovan and D. B. Bogy disclosed a method for measuring the flying height of a slider on pp. 4173–4175, No. 6, Vol. 30, IEEE Transaction in 1998. The laser beam is projected onto the back of the slider. By comparing the incident laser beam with the reflected laser beam from the slider, the velocity of the slider is obtained by frequency demodulation, and the movement of the slider is obtained by phase demodulation. However, according to this method, the magnetic head must be landed on the disk or a laser beam must be divided onto the surface of the disk for being used as reference light beam for the contact point. Beside, because the obtained flying height is the distance between the slider and the glide disk, deviation of the flying height rises owing to the dynamic actions of the slider and the distance variation.

In recent years, the flying height tends to be much lower because of increase of the coding density of a hard disk. For the present, the flying height is less than 25 nm, therefore more accurate measurement is expectable required. Phase Matrics Company and Zygo Company both disclosed that the flying height of a slider and the optical properties of the surface of the slider can be obtained by applying ellipsometry. C. Lacey assumes that the complex refraction index all over the slider are all the same, therefore the flying height and the complex refraction index values of the slider can be obtained by using a imaging ellipsometer. In his setup, a charge-coupled device (CCD) is used, and the ellipsometric information of multiple points can be obtained without further unloading the slider to vary its flying height. Therefore, the flying height of the slider can be obtained according to the pitch, roll, crown, cross-crown and twist parameters. The essential assumption in the method is that the slider is made of pure substrate regardless of thin films. However, it's not the case. Besides, the variation of the complex refraction index of the slider surface is not negligible for measuring the flying height. In 1996, Peter de Groot discloses how to obtain the complex refraction index of the magnetic by applying ellipsometry with fixed incident angle (U.S. Pat. No. 5,557,399). Please refer to FIG. 1, a schematic diagram of the conventional system for the flying height measurement, which is modeled as an air film 302, of a slider 301 by applying ellipsometry with fixed incident angle. In each measurement of the flying height of the slider, the slider 301 is loaded first, and moved from the distance over one wavelength to the distance less than one wavelength. The vertical and horizontal light intensities and the maximum and minimum values of the phase are measured for the first step, therefore the flying height d and the complex refraction indexes n, k values of the slider can be solved through the ellipsometry.

From 1995, it's well known that the magneto-impedance read-write head (MR head) is generally used as the read-write head of a hard disk. For improving read-write performance and increasing storing density, the flying height of the magneto-impedance read-write head (MR head) is generally set to be lower than 25 nm. Moreover, because the magneto-impedance read-write head (MR head) is sensitive to electrical field, a film made of diamond like carbon (DLC) being in a thickness of about 12 nm is generally coated on the surface of the magneto-impedance read-write head (MR head) by sputtering. Therefore, in order to obtain the surface property of the coated film with high reflectivity, an apparatus with resolution higher than 12 nm for measuring the flying height is needed. On the other hand, as for near-field optical storage technique, a slider of the hard disk with nanometer resolution is presently used as a loading stage to load an optical head. Therefore, it's important to focus on how to accurately measure the flying height of a loading stage applied in the near-field optical storage technique.

According to ellipsometry, the flying height of a slider is obtained by measuring the light intensity and the phase information of the light. The principle for measuring the flying height of a slider is described briefly as follows.

The electrical field of a planar wave can be decomposed into two orthogonal polarization components p wave and s wave in the vector form $$\vec{E} = \vec{E}_p + \vec{E}_s \quad (1)$$

which is further expressed in the Jone's matrix as follows $$\vec{E} = \begin{bmatrix} E_p \\ E_s \end{bmatrix} = \begin{bmatrix} E_{op} e^{j(\omega t - kz + \phi_p)} \\ E_{os} e^{j(\omega t - kz + \phi_s)} \end{bmatrix} \propto \begin{bmatrix} E_{op} e^{j\Delta} \\ E_{os} \end{bmatrix} \quad (2)$$

where $\Delta = \phi_p - \phi_s$, $E_{op}$ and $E_{os}$ are the respective electrical field amplitudes of the p wave and s wave, and the light beam transmits along the z axis. If the respective input polarization electrical fields of the p wave and s wave are $E_{ip}$ and $E_{is}$, and the respective output polarization electrical fields of that through a sample are $E_{rp}$ and $E_{rs}$, the respective reflection coefficients of the p wave and s wave are $$r_p = \frac{E_{rp}}{E_{ip}} = \rho_p e^{j\Delta_p} \quad (3)$$

$$r_s = \frac{E_{rs}}{E_{is}} = \rho_s e^{j\Delta_s} \quad (4)$$

where $\Delta_p$ is the phase shift of the reflected p wave, and $\Delta_s$ is the phase shift of the reflected s wave. The polarization transfer function F (ellipsometric function ρ) is thus defined as $$F = \rho = \frac{\frac{E_{rp}}{E_{rs}}}{\frac{E_{ip}}{E_{is}}} = \frac{\frac{E_{rp}}{E_{ip}}}{\frac{E_{rs}}{E_{is}}} = \frac{r_p}{r_s} = \frac{\rho_p e^{j\Delta_p}}{\rho_s e^{j\Delta_s}} = \tan\Psi e^{j\Delta} \quad (5)$$

where $$\tan\Psi = \frac{\rho_p}{\rho_s}$$

and $\Delta = \Delta_p - \Delta_s$ are ellipsometric parameters.

Please refer to FIG. 2, which is a schematic diagram showing an system configuration of a PMSA ellipsometer (P: the polarizer, M: the phase modulator, S: the sampler, and A: the analyzer). Every component can be expressed in a Jone's Matrix and the variation of the light beam can be described by the parameters. If the photo detector possesses linear correspondence, the measured signal behind the analyzer can be expressed as $$I = G\vec{E}_{out}^+ \vec{E}_{out} = G(ASMP\vec{E}_{in})^+(ASMP\vec{E}_{in}) \quad (6)$$

Expression (10) can be expressed as $$I(\delta) = G[I + I_p \sin(\delta) + I_s \cos(\delta)] \quad (7)$$

From the sensitivity of the photo detector, the linear circuit amplification and the ellipsometric parameters, the constant G can be determined. If phase of incident light beam is modulated, it is to be solved by a lock-in amplifier circuits and the ellipsometric parameters Ψ and Δ will be further obtained.

SUMMARY OF THE INVENTION

An object of the present invention is to provide a method and an apparatus for measuring the flying height of a slider with sub-nanometer resolution.

According to the first aspect of the present invention, the present invention is related to a method for measuring a distance between a sliding object and a transparent disk with sub-nanometer resolution, wherein the distance is regarded as a nanometer specimen, at least comprising steps of a) providing a sampling light beam with adjustable initial polarization state by phase modulation, and with variable incident angles, which is controlled by an optical control subsystem, relative to the air film and forming a first reflected light beam of the sampling light beam relative to the air film, b) guiding the first reflected light beam of the sampling light beam through the optical control subsystem to form a return light beam traveling in the opposite direction to the first reflected light beam, wherein the return light beam being incident to the specimen again at the the detecting site, therefore a second reflected light beam of the returned light beam is formed, while the second reflected light beam exits from the the optical control subsystem in the opposite direction to the the sampling light beam, it is to form a signal light beam, c) guiding the signal light beam through the analyzer and the detectors for detection of intensity and phase change of the signal light beam, and d) partially dividing the signal light beam to form a observing light beam, which is guided to a microscope and used as a light source for observation of the detecting site on the the specimen.

Preferably, the transparent disk is a glass disk.

Preferably, the distance is to be measured less than one wavelength of the linear polarizing light.

Preferably, the slider is made of non-dielectric material.

Preferably, the slider is in static state relative to the transparent disk while the sampling light beam is incident onto a surface of the slider.

Preferably, the slider is in motion relative to the transparent disk while the sampling light beam is incident onto a surface of the slider.

Preferably, the incident light beam of the return light beam exits from the optical control subsystem to becomes a signal light beam traveling along the same path but in the opposite direction to the sampling light beam and at least twice reflecting from the detecting site.

Preferably, the observing light beam is used for the microscope as a light source of observation on detecting site as well as for the auto-collimation of the sampling light beam.

According to the second aspect of the present invention, the present invention is related to a method for measuring a distance between a sliding object and a transparent disk with sub-nanometer resolution, wherein the distance is regarded as a nanometer specimen, at least comprising steps of a) providing a sampling light beam with adjustable initial polarization state by phase modulation, and with variable incident angles, which is controlled by an optical control subsystem, relative to the air film and forming a first reflected light beam of the sampling light beam relative to the air film, b) guiding the first reflected light beam of the sampling light beam through the optical control subsystem to form a return light beam traveling in the opposite direction to the first reflected light beam, wherein the return light beam being incident to the specimen again at the the detecting site, therefore a second reflected light beam of the returned light beam is formed, while the second reflected light beam exits from the the optical control subsystem in the opposite direction to the the sampling light beam, it is to form a signal light beam, c) guiding the signal light beam through the analyzer and the detectors for detection of intensity and phase change of the signal light beam, d) partially dividing the signal light beam to form a observing light beam, which is guided to a microscope and used as a light source for observation of the detecting site on the the specimen, e) partially dividing the sampling light beam to form a reference light beam, which is guided to a reference light beam analyzer for measuring light intensity and phase change of the reference light beam as a calibration reference of non-linear phase retardation and non-uniform absorption in the phase modulator, and f) polarization state control method that utilizes intensity and phase change of the reference light beam as parameters to accurately control the polarization state of the sampling light beam.

Preferably, the transparent disk is a glass disk.

Preferably, the distance is to be measured less than one wavelength of the linear polarizing light.

Preferably, the slider is made of non-dielectric material.

Preferably, the slider is in static state relative to the transparent disk while the sampling light beam is incident onto a surface of the slider.

Preferably, the slider is in motion relative to the transparent disk while the sampling light beam is incident onto a surface of the slider.

Preferably, the incident light beam of the return light beam exits from the optical control subsystem to becomes a signal light beam traveling along the same path but in the opposite direction to the sampling light beam and at least twice reflecting from the detecting site.

Preferably, the observing light beam is used for the microscope as a light source of observation on detecting site as well as for the auto-collimation of the sampling light beam.

Preferably, control of polarization state of the sampling beam is done by a open-loop control.

Preferably, control of polarization state of the sampling beam is done by a close-loop control.

According to the third aspect of the present invention, the present invention is related to an apparatus for measuring the distance between a sliding object and a transparent disk with sub-nanometer resolution, wherein the distance is regarded as a nanometer specimen, at least comprising of a linear polarizing light source subsystem of which light intensity is to be tuned and initial linear polarization state is provided thereof to form a sampling light beam, a phase modulator for the control of phase change of the sampling light beam to vary initial polarization state of the linear polarizing light source, an optical control subsystem, which comprises a beam-bending element for guiding the sampling light beam incident to the detecting site in various angles, a carrier carrying and moving the the beam-bending element, and an optical component set comprising a focusing element and a normal reflection element, wherein the focusing element is used to guide the sampling light beam passing through the transparent disk to form a first reflected light beam at a detecting site of the specimen, and wherein the normal reflection element is used to normally reflect the first reflected light beam to form a return light beam traveling along the same path but in the direction opposite to the sampling light beam, therefore, a second reflected light beam of the return light beam at the detecting site is formed, while the second reflected light beam exits from the the optical control subsystem in the opposite direction to the the sampling light beam, it is to form a signal light beam, and a signal analysis subsystem for detecting light intensity and phase change of the signal light beam.

Preferably, the linear polarizing light source subsystem is simply a monochromatic, linear polarized light.

Preferably, the linear polarizing light source subsystem is composed of a diode laser and a linear polarizer.

Preferably, the linear polarizing light source subsystem further is composed of a light emitted diode (LED) and a linear polarizer.

Preferably, the phase modulator is a liquid crystal panel.

Preferably, the phase modulator is a photo-elastic phase modulator.

Preferably, the phase modulator is an optical compensator.

Preferably, the phase modulator is a half waveplate.

Preferably, the phase modulator is a quarter waveplate.

Preferably, the beam-bending element is a reflective mirror.

Preferably, the beam-bending element is a triangular prism.

Preferably, the beam-bending element is a penta prism.

Preferably, the carrier is a single-axis motion stage driven by a stepping motor.

Preferably, the carrier is a single-axis motion stage driven by a DC motor.

Preferably, the focusing element is a focusing mirror and the normal reflection element is a plane reflective mirror.

Preferably, the focusing element is a concave pseudo-paraboloidal mirror and the normal reflection element is a concave pseudo-spherical mirror.

Preferably, the signal analysis subsystem is composed of an analyzer and a photo detector.

According to the fourth aspect of the present invention, the present invention is related to an apparatus for measuring a distance between a sliding object and a transparent disk with sub-nanometer resolution, wherein the distance is regarded as a nanometer specimen, at least comprising of a linear polarizing light source subsystem of which light intensity is to be tuned and initial linear polarization state is provided thereof to form a sampling light beam, a phase modulator for the control of phase change of the sampling light beam to vary initial polarization state of the linear polarizing light source, an optical control subsystem, which comprises a beam-bending element for guiding the sampling light beam incident to the detecting site in various angles, a carrier carrying and moving the the beam-bending element, and an optical component set comprising a focusing element and a normal reflection element, wherein the focusing element is used to guide the sampling light beam passing through the transparent disk to form a first reflected light beam at a detecting site of the specimen, and wherein the normal reflection element is used to normally reflect the first reflected light beam to form a return light beam traveling along the same path but in the direction opposite to the sampling light beam, therefore, a second reflected light beam of the return light beam at the detecting site is formed, while the second reflected light beam exits from the the optical control subsystem in the opposite direction to the the sampling light beam, it is to form a signal light beam, a signal analysis subsystem for detecting light intensity and phase change of the signal light beam, a reference analysis subsystem for detection of light intensity and polarization state variation of the reference light beam and calibration of non-linear phase retardation and non-uniform absorption in the phase modulator to accurately control the polarization state of the sampling light beam, and a transfer function calibration device for detection of unknown ellipsometric parameters of the optical system.

Preferably, the linear polarizing light source subsystem is simply a monochromatic, linear polarized light.

Preferably, the linear polarizing light source subsystem is composed of a diode laser and a linear polarizer.

Preferably, the linear polarizing light source subsystem further is composed of a light emitted diode (LED) and a linear polarizer.

Preferably, the phase modulator is a liquid crystal panel.

Preferably, the phase modulator is a photo-elastic phase modulator.

Preferably, the phase modulator is an optical compensator.

Preferably, the phase modulator is a half waveplate.

Preferably, the phase modulator is a quarter waveplate.

Preferably, the beam-bending element is a reflective mirror.

Preferably, the beam-bending element is a triangular prism.

Preferably, the beam-bending element is a penta prism.

Preferably, the carrier is a single-axis motion stage driven by a stepping motor.

Preferably, the carrier is a single-axis motion stage driven by a DC motor.

Preferably, the focusing element is a focusing mirror and the normal reflection element is a plane reflective mirror.

Preferably, the focusing element is a concave pseudo-paraboloidal mirror and the normal reflection element is a concave pseudo-spherical mirror.

Preferably, the signal analysis subsystem is composed of an analyzer and a photo detector.

Preferably, the reference analysis subsystem is composed of an analyzer, a first photo detector and a second photo detector.

Preferably, the transfer function calibration device is a convex pseudo-spherical mirror.

BRIEF DESCRIPTION OF THE DRAWING

The present invention may best be understood through the following description with reference to the accompanying drawings, in which.

DETAILED DESCRIPTION OF THE PREFERRED EMBODIMENTS

Figure 1:
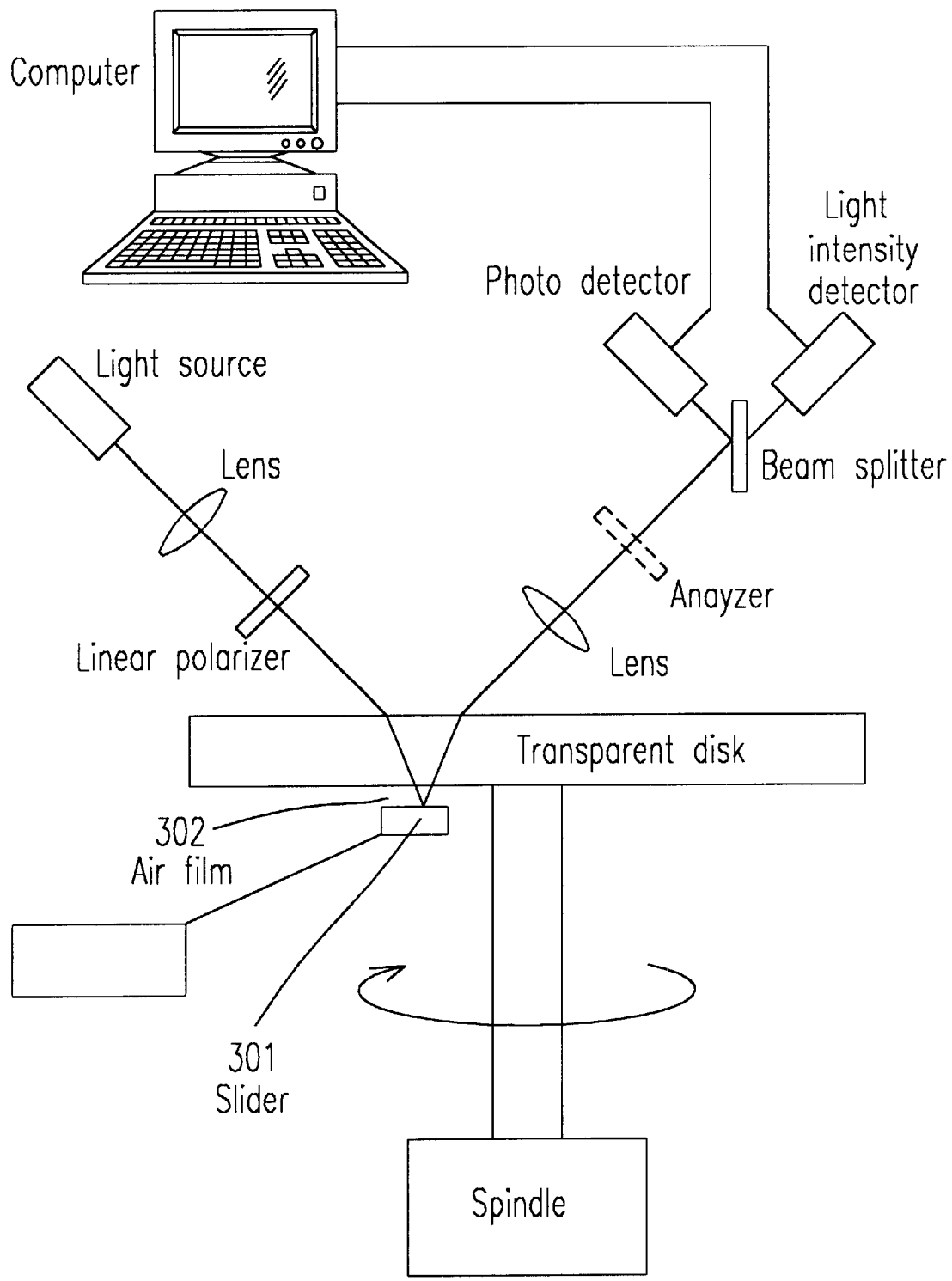
FIG. 1 is a schematic diagram showing the conventional system for measuring the flying height of a slider by applying ellipsometry with fixed incident angle.
Figure 2:
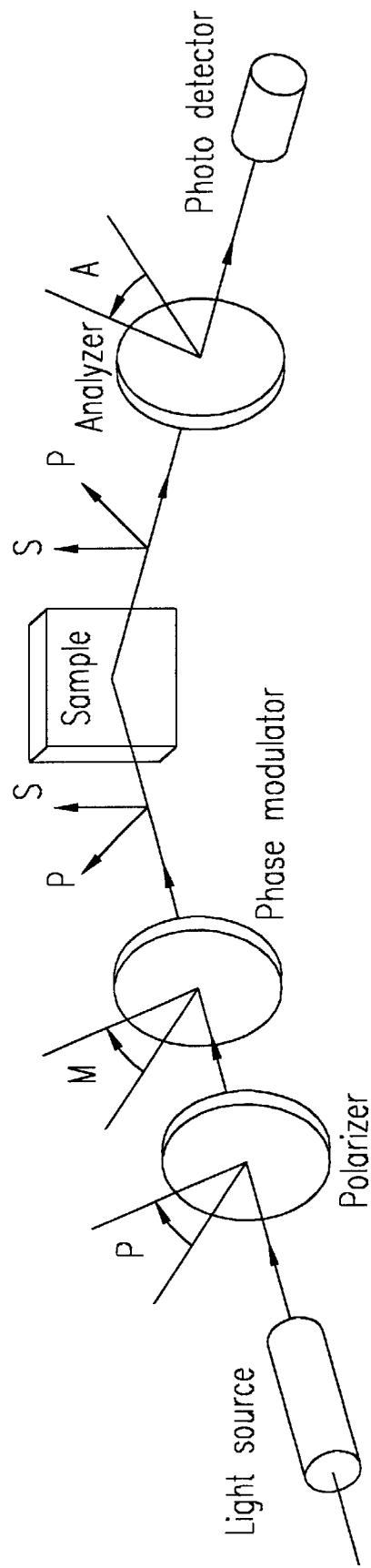
FIG. 2 is a schematic diagram showing an optical architecture of a PMSA type ellipsometer.
Figure 3:
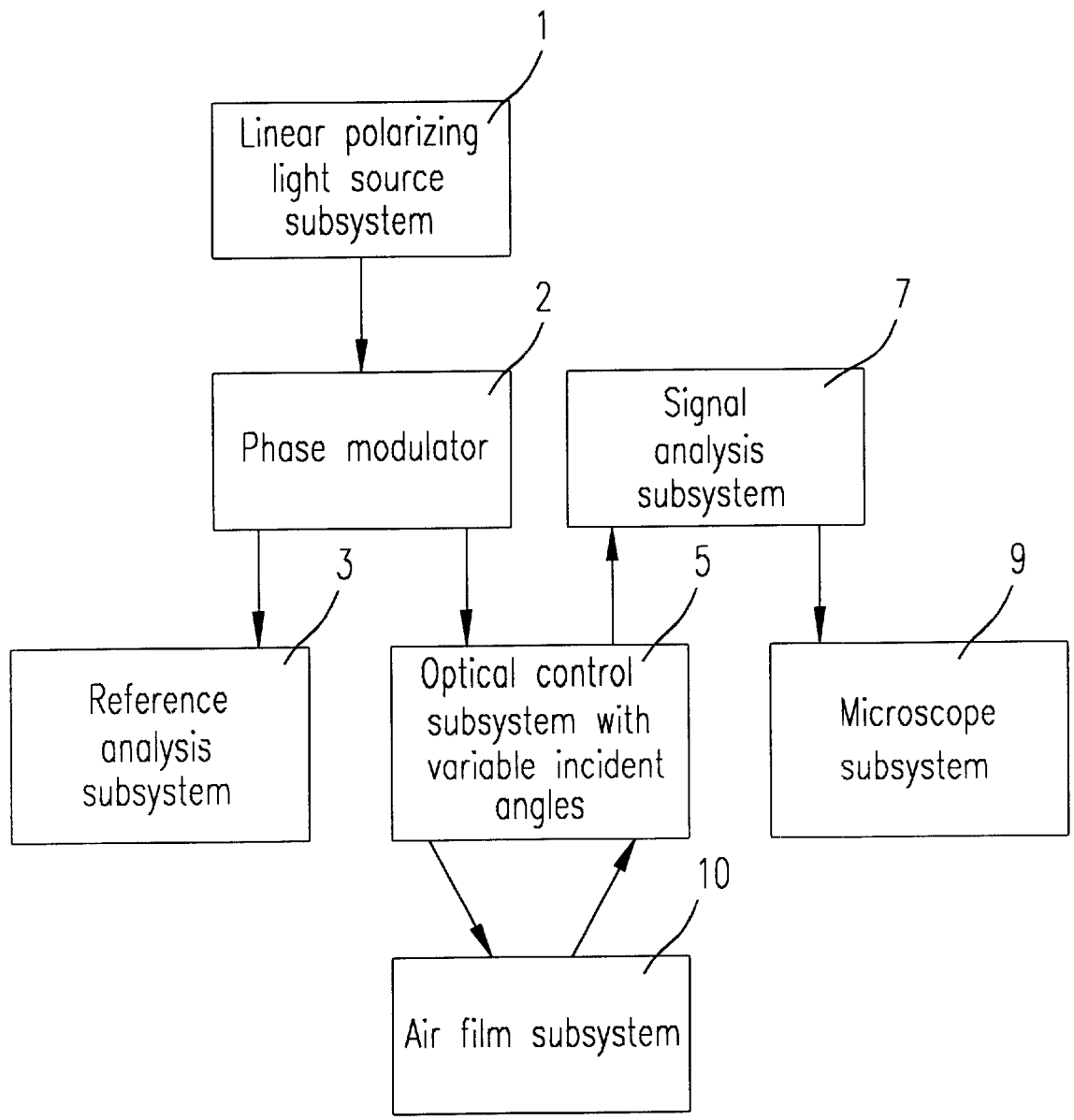
FIG. 3 is a schematic diagram showing an architecture of a preferred embodiment of the apparatus for measuring the flying height of a slider according to the present invention.
Figure 6:
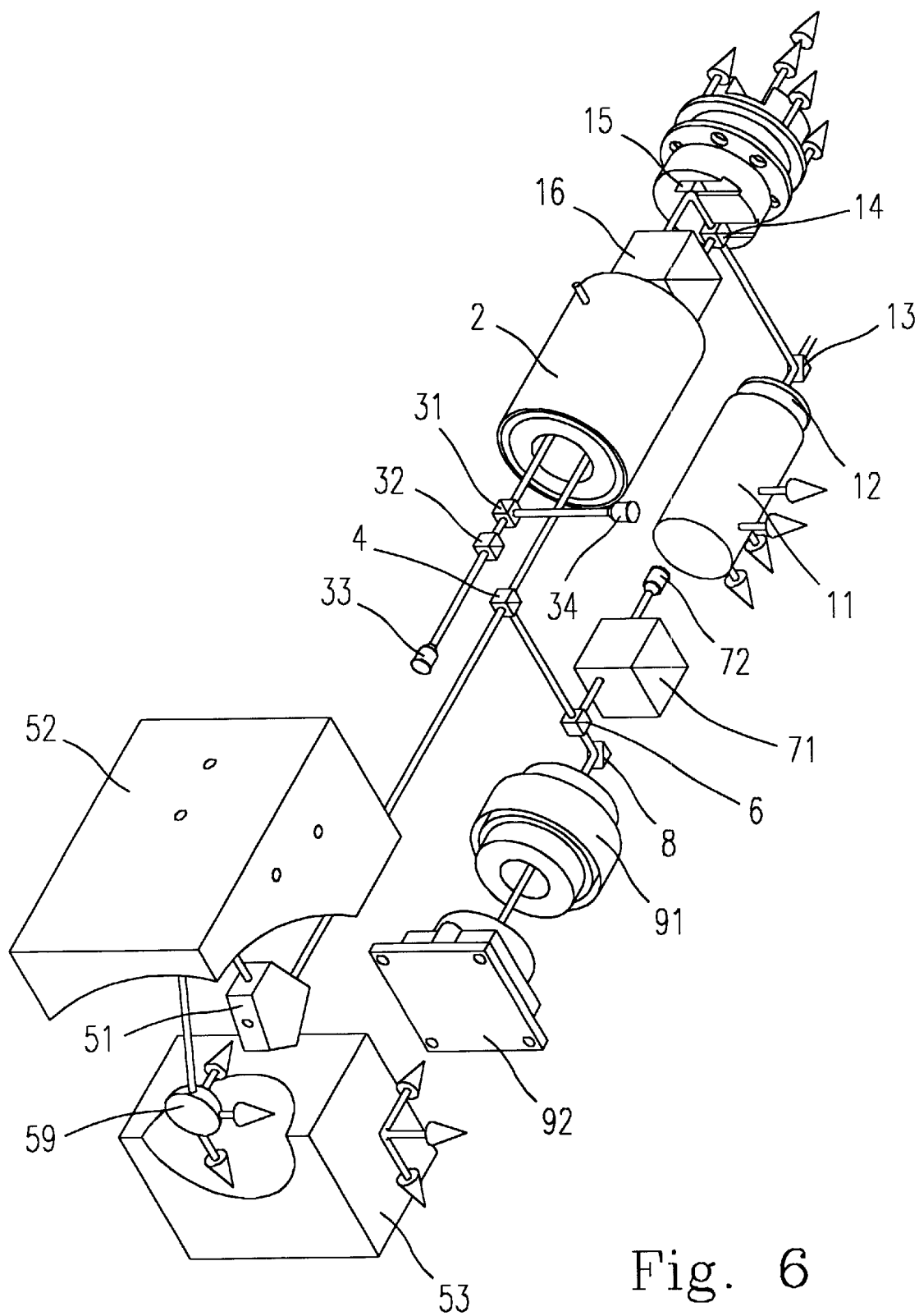
FIG. 6 is a perspective diagram showing a structure of FIG. 4 according to the present invention.
Figure 7:
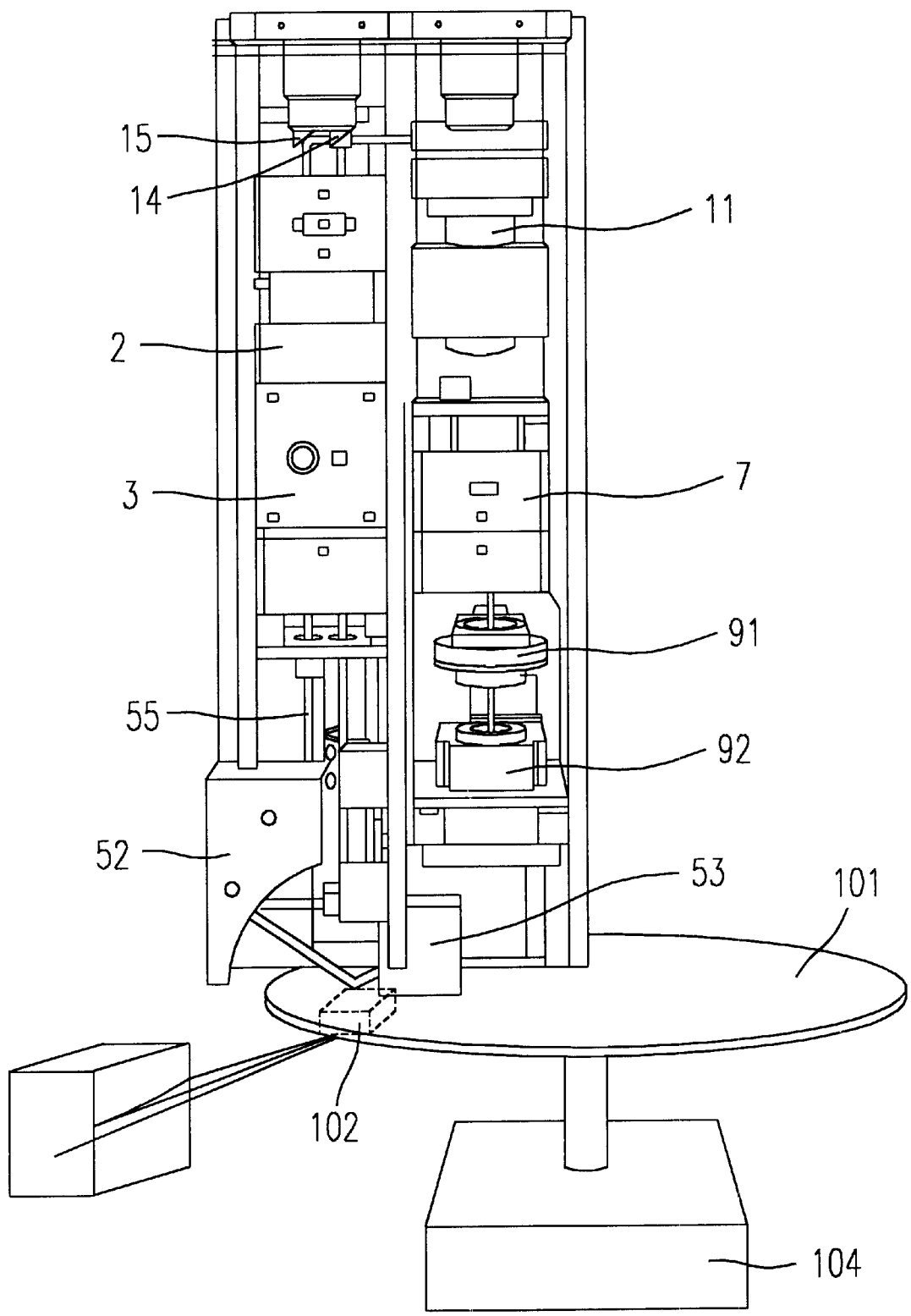
FIG. 7 is a schematic diagram showing an assembled optical system of FIG. 4 according to the present invention.

Please refer to FIG. 3, which is a schematic diagram showing an architecture of a preferred embodiment of the apparatus for measuring the flying height of a slider according to the present invention. The apparatus comprises a linear polarizing light source subsystem 1, a phase modulator 2, a reference analysis subsystem 3, an optical control ubsystem with variable incident angles 5, a signal analysis subsystem 7, microscope subsystem 9, and an air film subsystem 10 as a model of lying height. FIG. 6 schematically shows a structure of FIG. 4, and FIG. 7 schematically shows an assembled optical system of FIG. 4 according to the present invention.

Figure 4:
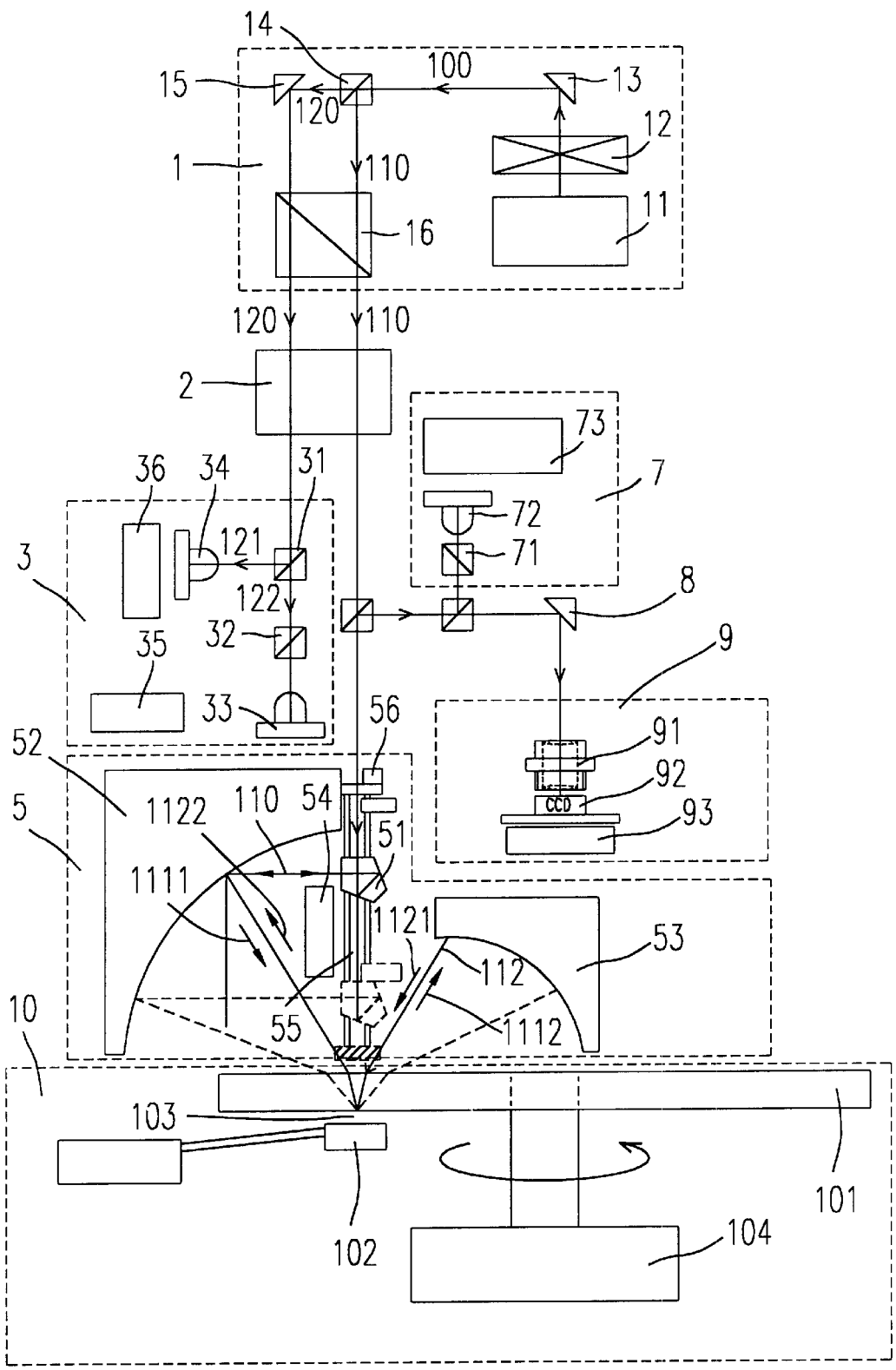
FIG. 4 is a schematic diagram showing a layout of FIG. 3 of all the optical devices according to the present invention.

Please refer to FIG. 4, which is a schematic diagram showing a layout of FIG. 3 of all the optical devices according to the present invention. After the light beam 100 transmits through the attenuator 12, the reflective mirror 13 and the non-polarizing beamsplitter (NPBS) 14, the light beam is decomposed into a reference light beam 120 and a sampling light beam 110 by the non-polarizing beamsplitter (NPBS) 14. Then the reference light beam 120 transmits through the reflection mirror 15, the linear polarizer 16, the phase modulator 2, and the reference analysis subsystem 3. The obtained light intensity and polarization state of the reference light beam 120 can be used as reference for controlling the light intensity and polarization state of the sampling light beam 110. The reference light beam 120 is decomposed into a first reference light beam 121 and a second reference light beam 122 by the non-polarizing beamsplitter (NPBS) 31. The first reference light beam 121 then transmits to the photo detector 34 and the optical amplifier 36, and the second reference light beam 122 then transmits to the photo detector 33 and the optical amplifier 35 through an analyzer 32. Therefore, the light intensities of the first reference light beam 121 and the second reference light beam 122 can be obtained by measuring the light intensities of the photo detectors 33, 34 via a data acquisition card. On the other hand, the sampling light beam 110 transmits through the linear polarizer 16, the phase modulator 2 and thereafter enters into the optical control subsystem 5 through the beam-bending element 51. According to the present invention, the one-axis motion stage 55 carrying the beam-bending element 51 is controlled by a DC motor 56 and a motion control card 54. While the one-axis motion stage 55 moves upward and downward along the direction of z-axis, the incident angle of the beam 1111 is varied. The sampling light beam 110 is focused on the detecting site of the air film 103 by a concave pseudo-paraboloidal mirror 52 first. After the incident light beam 1111 of the sampling light beam 110 is reflected at a detecting site of the air film 103 for the first time, the reflected light beam 1112 is normally reflected by the concave pseudo-spherical mirror 53, and thus a return light beam 112 is thus formed. After the incident light beam 1121 of the return light beam 112 is reflected at the same detecting site of the air film 103 for the second time, a reflected light beam 1122, which transmits in the direction opposite to the incident light beam 1111, is formed. Thereafter, the reflected light beam 1122 is decomposed into a signal light beam 113 and an observing light beam 114 by the non-polarizing beamsplitter (NPBS) 6. The signal light beam transmits through an analyzer 71 onto the photo detector 72, in which signal is electronically measured by the optical amplifier 73, and the observing light beam 114, reflected by a mirror 8, transmits into the microscope 9.

The microscope subsystem 9 comprising the lens assembly 91 and the charge-coupled device 92 is used for observing a position of the detecting site relative to the slider 102. The light source of observing light beam 114 applying in the microscope 9, i.e. laser beam source 11, is the same with that of the sampling light beam 110, therefore an extra light source is not required. Besides, by using a frame grabber 93, the microscope 9 electrically connected with a monitor can be served as an autocollimator for the sampling light beam 110.

Figure 5A:
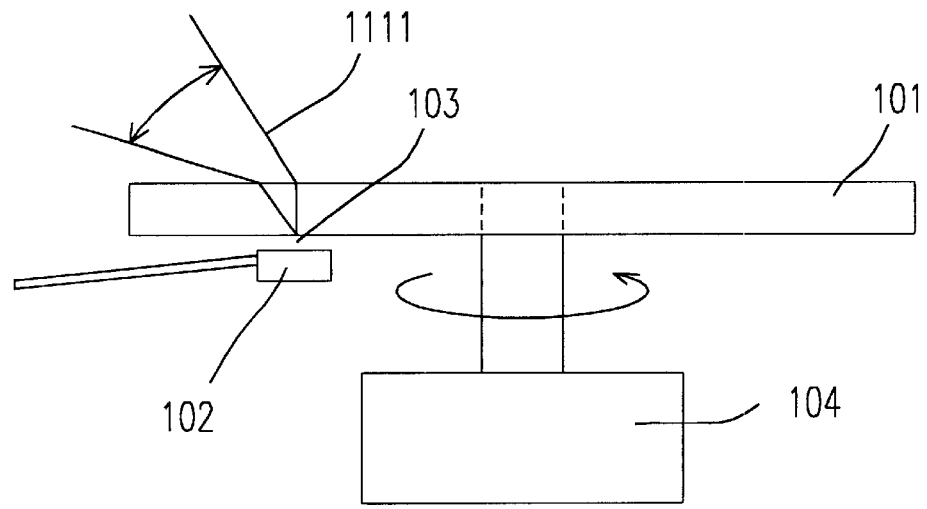
FIGS. 5(a) and (b) are front view and bottom plane view of the air film system of FIG. 4, indicating the position of the slider.
Figure 5B:
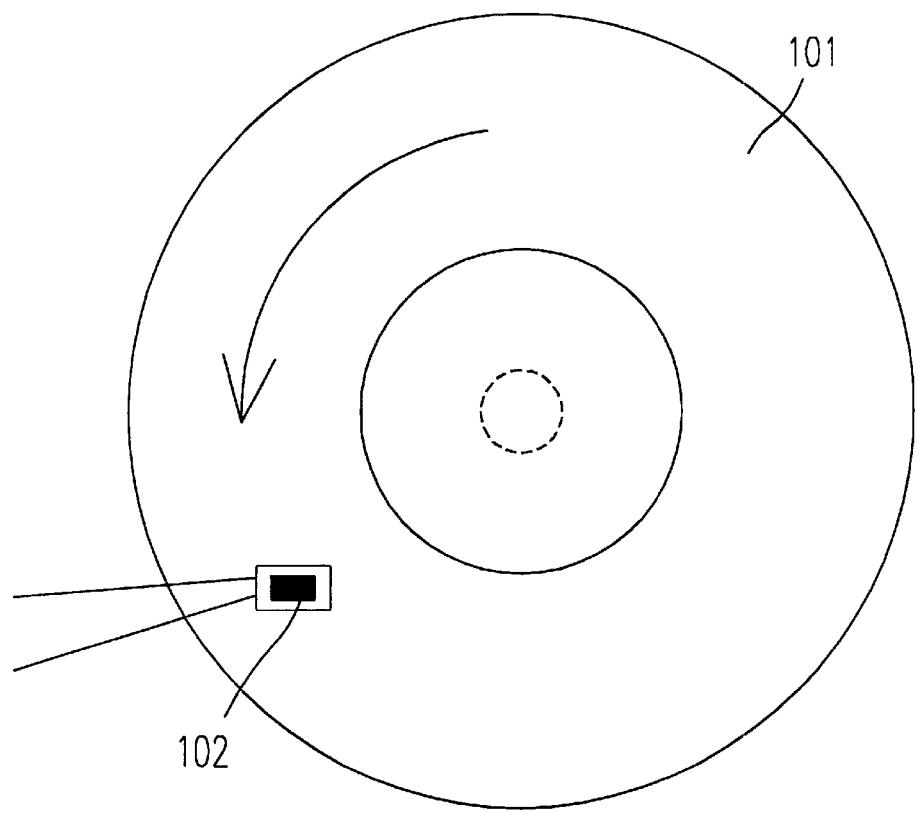

Please refer to FIGS. 5(a) and (b), which are front view and bottom plane view of the air film system of FIG. 4, indicating the position of the slider. The thickness of the air film 103 between the slider 102 and the transparent disk 101, i.e. the flying height of the slider 102, is measured by applying ellipsometry. The spindle 104 drives rotation of the transparent disk 101. If the rotating speed of the spindle 104 is changed, the thickness of the air film 103 is thus correspondingly varied.

The electrical fields for the light beam passing through each device can be respectively expressed in forms of Jone's vectors and the Jone's matrices:

The laser beam source 11 is $$E_i = \begin{bmatrix} E_{ip} \\ E_{is} \end{bmatrix} \tag{8}$$

The light beam after passing through the ellipsometer is $$E_r = \begin{bmatrix} E_{rp} \\ E_{rs} \end{bmatrix} \tag{9}$$

The linear polarizer 16 is $$P = \begin{bmatrix} \cos^2 b & \sin b \cos b \\ \sin b \cos b & \sin^2 b \end{bmatrix} \tag{10}$$

The phase modulator 2 is $$M = \begin{bmatrix} e^{\frac{j\delta}{2}} \cos^2 m + e^{\frac{-j\delta}{2}} \sin^2 m & 2i \sin m \cos m \sin\left(\frac{-\delta}{2}\right) \\ 2i \sin m \cos m \sin\left(\frac{-\delta}{2}\right) & e^{\frac{-j\delta}{2}} \cos^2 m + e^{\frac{j\delta}{2}} \sin^2 m \end{bmatrix} \tag{11}$$

The beam-bending element 51 is $$X = \text{Prism mirror} = \begin{bmatrix} \tan\psi_x e^{j\Delta_x} & 0 \\ 0 & 1 \end{bmatrix} \tag{12}$$

The concave pseudo-parabolic mirror 52 is $$Y = \begin{bmatrix} \tan\psi_y e^{j\Delta_y} & 0 \\ 0 & 1 \end{bmatrix} \tag{13}$$

The air film 102 is $$S = \begin{bmatrix} |R_p|e^{j\delta_p} & 0 \\ 0 & |R_s|e^{j\delta_s} \end{bmatrix} = |R_s|e^{j\delta_s}\begin{bmatrix} \tan\psi e^{j\Delta} & 0 \\ 0 & 1 \end{bmatrix} \equiv \begin{bmatrix} \tan\psi e^{j\Delta} & 0 \\ 0 & 1 \end{bmatrix} \tag{14}$$

where $$\tan\psi = \frac{|R_p|}{|R_s|}$$

and $\Delta = \delta_p - \delta_s$. $|R_s|e^{j\delta_s}$ is a constant when the incident phase angle of the s wave is fixed, while which is not a constant when the phase or the incident angle is changed.

The concave pseudo-spherical mirror 53 is $$W = \begin{bmatrix} -1 & 0 \\ 0 & 1 \end{bmatrix} \tag{15}$$

According to the Jone's vectors and the Jone's matrixes of all the devices as described above, the whole Jone's matrix configuration of the apparatus for measuring the flying height of a slider is PMXYSWSYXA. The relationship between the sampling light beam and the signal light beam and the light intensity is as follows.

$$E_r = AXYSWSYXMPE_i = AS_0MPE_i \tag{16}$$

$$I = GE_r^+ E_r = G(AS_0MPE_i)^+(AS_0MPE_i) \tag{17}$$

where $S_0$ is the combined Jone's matrix of the optical system and the air film.

$$S_0 = XYSWSYX \tag{18}$$

$$= \begin{bmatrix} -\tan^2 \psi_x \tan^2 \psi_y \tan^2 \psi e^{j(2\Delta_x + 2\Delta_y + 2\Delta)} & 0 \\ 0 & 1 \end{bmatrix}$$

$$= \begin{bmatrix} \tan^2 \psi_x \tan^2 \psi_y \tan^2 \psi e^{j(2\Delta_x + 2\Delta_y + 2\Delta + \pi)} & 0 \\ 0 & 1 \end{bmatrix}$$

$$= \begin{bmatrix} \tan \psi_0 e^{j\Delta_0} & 0 \\ 0 & 1 \end{bmatrix}$$

$$\tan \psi_0 = \tan^2 \psi_x \tan^2 \psi_y \tan^2 \psi$$

$$\Delta_0 = 2\Delta_x + 2\Delta_y + 2\Delta + \pi$$

Given that b=0°, m=45° and a=45°, the light intensity $$I = G[1 - (\sin 2\psi_0 \sin \Delta_0)\sin \delta - \cos 2\psi_0 \cos \delta] \tag{19}$$

According to the expression (19), $\psi_0$ and $\Delta_0$ can be obtained. Further, $\psi$ and $\Delta$ can be obtained by calibration of the transfer function. A device of convex pseudo-spherical mirror together with the above mentioned optical control subsystem is used to obtain the transfer function of the entire optical system. The Jone's matrix of the convex pseudo-spherical mirror is $$Z = \begin{bmatrix} -1 & 0 \\ 0 & 1 \end{bmatrix} \tag{20}$$

and thus the whole Jone's matrix of the apparatus is PMX-YZYXA.

$$E_r = AXYZYXMPE_i \tag{21}$$

$$= AS_1 MPE_i$$

where $$S_1 = XYZYX \tag{22}$$

$$= \begin{bmatrix} -\tan^2 \psi_x \tan^2 \psi_y e^{j(2\Delta_x + 2\Delta_y)} & 0 \\ 0 & 1 \end{bmatrix}$$

$$= \begin{bmatrix} -\tan^2 \psi_x \tan^2 \psi_y e^{j(2\Delta_x + 2\Delta_y + \pi)} & 0 \\ 0 & 1 \end{bmatrix}$$

$$= \begin{bmatrix} \tan \psi_1 e^{j\Delta_1} & 0 \\ 0 & 1 \end{bmatrix}$$

$$\tan \psi_1 = \tan^2 \psi_x \tan^2 \psi_y$$

$$\Delta_1 = 2\Delta_x + 2\Delta_y + \pi$$

$$I = GE_r^+ + E_r = G(AS_1 MPE_i)^+ (AS_1 MPE_i) \tag{23}$$

$$= G[1 - (\sin 2\psi_1 \sin \Delta_1)\sin \delta - \cos 2\psi_1 \cos \delta]$$

Therefore, $\psi_1$ and $\Delta_1$ can be obtained, and the transfer function $\tan^2 \psi_x \tan^2 \psi_y e^{j(2\Delta_x + 2\Delta_y)}$ can be further obtained, and the ellipsometric parameters $\psi$ and $\Delta$ can be measured. The light intensities measured by phase modulation is to be phase decomposed with the employment of a lock-in amplifier. Accordingly, the thickness of the air film, i.e. flying height, and the complex refraction index can be determined by applying ellipsometry.

The sensitivities of the light intensity and the phase relative to the flying height are complementary. In other words, the phase is not sensitive relative to the flying height when the light intensity is sensitive to the flying height, while the phase is sensitive relative to the flying height when the light intensity is not sensitive to the flying height. By applying the light intensity and the phase information for use in the ellipsometry, a sub-nanometer resolution for measuring the flying height for a slider on a transparent disk is therefore achieved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A method for measuring a distance between a sliding object and a transparent disk with sub-nanometer resolution, wherein the distance is regarded as a nanometer specimen, comprising steps of:

a) providing a sampling light beam with adjustable initial polarization state by phase modulation, and with variable incident angles, which is controlled by an optical control subsystem, relative to said air film and forming a first reflected light beam of said sampling light beam relative to said air film;

b) guiding said first reflected light beam of said sampling light beam through said optical control subsystem to form a return light beam traveling in the opposite direction to said first reflected light beam, wherein said return light beam being incident to the specimen again at said detecting site, therefore a second reflected light beam of said returned light beam is formed, while said second reflected light beam exits from the said optical control subsystem in the opposite direction to the said sampling light beam, it is to form a signal light beam;

c) guiding said signal light beam through an analyzer and the detectors for detection of intensity and phase change of said signal light beam; and d) partially dividing said signal light beam to form an observing light beam, which is guided to a microscope and used as a light source for observation of said detecting site on said specimen.

2. The method according to claim 1, wherein said transparent disk is a glass disk.

3. The method according to claim 1, wherein said distance is to be measured less than one wavelength of said linear polarizing light.

4. The method according to claim 1, wherein said slider is made of non-dielectric material.

5. The method according to claim 1, wherein said slider is in static state relative to said transparent disk while said sampling light beam is incident onto a surface of said slider.

6. The method according to claim 1, wherein said slider is in motion relative to said transparent disk while said sampling light beam is incident onto a surface of said slider.

7. The method according to claim 1, wherein said incident light beam of said return light beam exits from said optical control subsystem to becomes a signal light beam traveling along the same path but in the opposite direction to said sampling light beam and at least twice reflecting from said detecting site.

8. The method according to claim 1, wherein said observing light beam is used for said microscope as a light source of observation on detecting site as well as for the auto-collimation of said sampling light beam.

9. A method for measuring a distance between a sliding object and a transparent disk with sub-nanometer resolution, wherein the distance is regarded as a nanometer specimen, comprising steps of:
   a) providing a sampling light beam with adjustable initial polarization state by phase modulation, and with variable incident angles, which is controlled by an optical control subsystem, relative to said air film and forming a first reflected light beam of said sampling light beam relative to said air film;
   b) guiding said first reflected light beam of said sampling light beam through said optical control subsystem to form a return light beam traveling in the opposite direction to said first reflected light beam, wherein said return light beam being incident to the specimen again at said detecting site, therefore a second reflected light beam of said returned light beam is formed, while said second reflected light beam exits from the said optical control subsystem in the opposite direction to the said sampling light beam, it is to form a signal light beam;
   c) guiding said signal light beam through an analyzer and the detectors for detection of intensity and phase change of said signal light beam;
   d) partially dividing said signal light beam to form an observing light beam, which is guided to a microscope and used as a light source for observation of said detecting site on said specimen;
   e) partially dividing said sampling light beam to form a reference light beam, which is guided to a reference light beam analyzer for measuring light intensity and phase change of said reference light beam as a calibration reference of non-linear phase retardation and non-uniform absorption in said phase modulator; and
   f) providing a polarization state control method utilizing intensity and phase change of said reference light beam as parameters to accurately control the polarization state of said sampling light beam.

10. The method according to claim 9, wherein said transparent disk is a glass disk.

11. The method according to claim 9, wherein said distance is to be measured less than one wavelength of said linear polarizing light.

12. The method according to claim 9, wherein said slider is made of non-dielectric material.

13. The method according to claim 9, wherein said slider is in static state relative to said transparent disk while said sampling light beam is incident onto a surface of said slider.

14. The method according to claim 9, wherein said slider is in motion relative to said transparent disk while said sampling light beam is incident onto a surface of said slider.

15. The method according to claim 9, wherein said incident light beam of said return light beam exits from said optical control subsystem to becomes a signal light beam traveling along the same path but in the opposite direction to said sampling light beam and at least twice reflecting from said detecting site.

16. The method according to claim 9, wherein said observing light beam is used for said microscope as a light source of observation on detecting site as well as for the auto-collimation of said sampling light beam.

17. The method according to claim 9, wherein control of polarization state of said sampling beam is done by a open-loop control.

18. The method according to claim 9, wherein control of polarization state of said sampling beam is done by a close-loop control.

19. An apparatus for measuring the distance between a sliding object and a transparent disk with sub-nanometer resolution, wherein the distance is regarded as a nanometer specimen, comprising:
   a linear polarizing light source subsystem of which light intensity is to be tuned and initial linear polarization state is provided thereof to form a sampling light beam;
   a phase modulator for the control of phase change of said sampling light beam to vary initial polarization state of said linear polarizing light source;
   an optical control subsystem, which comprises a beam-bending element for guiding said sampling light beam incident to the detecting site in various angles, a carrier carrying and moving the said beam-bending element, and an optical component set comprising a focusing element and a normal reflection element, wherein said focusing element is used to guide said sampling light beam passing through said transparent disk to form a first reflected light beam at a detecting site of said specimen, and wherein said normal reflection element is used to normally reflect said first reflected light beam to form a return light beam traveling along the same path but in the direction opposite to said sampling light beam, therefore, a second reflected light beam of said return light beam at said detecting site is formed, while said second reflected light beam exits from the said optical control subsystem in the opposite direction to the said sampling light beam, it is to form a signal light beam; and
   a signal analysis subsystem for detecting light intensity and phase change of said signal light beam.

20. The apparatus according to claim 19, wherein said linear polarizing light source subsystem is simply a monochromatic, linear polarized light.

21. The apparatus according to claim 19, wherein said linear polarizing light source subsystem is composed of a diode laser and a linear polarizer.

22. The apparatus according to claim 19, wherein said linear polarizing light source subsystem further is composed of a light emitted diode (LED) and a linear polarizer.

23. The apparatus according to claim 19, wherein said phase modulator is a liquid crystal panel.

24. The apparatus according to claim 19, wherein said phase modulator is a photo-elastic phase modulator.

25. The apparatus according to claim 19, wherein said phase modulator is an optical compensator.

26. The apparatus according to claim 19, wherein said phase modulator is a half waveplate.

27. The apparatus according to claim 19, wherein said phase modulator is a quarter waveplate.

28. The apparatus according to claim 19, wherein said beam-bending element is a reflective mirror.

29. The apparatus according to claim 19, wherein said beam-bending element is a triangular prism.

30. The apparatus according to claim 19, wherein said beam-bending element is a penta prism.

31. The apparatus according to claim 19 wherein said carrier is a single-axis motion stage driven by a stepping motor.

32. The apparatus according to claim 19, wherein said carrier is a single-axis motion stage driven by a DC motor.

33. The apparatus according to claim 19, wherein said focusing element is a focusing mirror and said normal reflection element is a plane reflective mirror.

34. The apparatus according to claim 19, wherein said focusing element is a concave pseudo-paraboloidal mirror and said normal reflection element is a concave pseudo-spherical mirror.

35. The apparatus according to claim 19, wherein said signal analysis subsystem is composed of an analyzer and a photo detector.

36. The apparatus according to claim 35, wherein said focusing element is a concave pseudo-paraboloidal mirror and said normal reflection element is a concave pseudo-spherical mirror.

37. An apparatus for measuring a distance between a sliding object and a transparent disk with sub-nanometer resolution, wherein the distance is regarded as a nanometer specimen, comprising:

a linear polarizing light source subsystem of which light intensity is to be tuned and initial linear polarization state is provided thereof to form a sampling light beam;

a phase modulator for the control of phase change of said sampling light beam to vary initial polarization state of said linear polarizing light source;

an optical control subsystem, which comprises a beam-bending element for guiding said sampling light beam incident to the detecting site in various angles, a carrier carrying and moving the said beam-bending element, and an optical component set comprising a focusing element and a normal reflection element, wherein said focusing element is used to guide said sampling light beam passing through said transparent disk to form a first reflected light beam at a detecting site of said specimen, and wherein said normal reflection element is used to normally reflect said first reflected light beam to form a return light beam traveling along the same path but in the direction opposite to said sampling light beam, therefore, a second reflected light beam of said return light beam at said detecting site is formed, while said second reflected light beam exits from the said optical control subsystem in the opposite direction to the said sampling light beam, it is to form a signal light beam;

a signal analysis subsystem for detecting light intensity and phase change of said signal light beam;

a reference analysis subsystem for detection of light intensity and polarization state variation of said reference light beam and calibration of non-linear phase retardation and non-uniform absorption in said phase modulator to accurately control said polarization state of said sampling light beam; and a transfer function calibration device for detection of unknown ellipsometric parameters of said optical system.

38. The apparatus according to claim 37, wherein said linear polarizing light source subsystem is simply a monochromatic, linear polarized light.

39. The apparatus according to claim 37, wherein said linear polarizing light source subsystem is composed of a diode laser and a linear polarizer.

40. The apparatus according to claim 37, wherein said linear polarizing light source subsystem further is composed of a light emitted diode (LED) and a linear polarizer.

41. The apparatus according to claim 37, wherein said phase modulator is a liquid crystal panel.

42. The apparatus according to claim 37, wherein said phase modulator is a photo-elastic phase modulator.

43. The apparatus according to claim 37, wherein said phase modulator is an optical compensator.

44. The apparatus according to claim 37, wherein said phase modulator is a half waveplate.

45. The apparatus according to claim 37, wherein said phase modulator is a quarter waveplate.

46. The apparatus according to claim 37, wherein said beam-bending element is a reflective mirror.

47. The apparatus according to claim 37, wherein said beam-bending element is a triangular prism.

48. The apparatus according to claim 37, wherein said beam-bending element is a penta prism.

49. The apparatus according to claim 37, wherein said carrier is a single-axis motion stage driven by a stepping motor.

50. The apparatus according to claim 37, wherein said carrier is a single-axis motion stage driven by a DC motor.

51. The apparatus according to claim 37, wherein said focusing element is a focusing mirror and said normal reflection element is a plane reflective mirror.

52. The apparatus according to claim 37, wherein said signal analysis subsystem is composed of an analyzer and a photo detector.

53. The apparatus according to claim 37, wherein said reference analysis subsystem is composed of an analyzer, a first photo detector and a second photo detector.

54. The apparatus according to claim 37, wherein said transfer function calibration device is a convex pseudo-spherical mirror.

* * * * *